United States Patent

Nonogaki et al.

[11] Patent Number: 6,165,393
[45] Date of Patent: Dec. 26, 2000

[54] PRODUCTION METHOD OF DIELECTRIC LENS

[75] Inventors: Hiroshi Nonogaki, Shiga-ken; Keizo Yamamoto, Osaka; Tatsuhiro Nakamura, Moriyama, all of Japan

[73] Assignee: Murata Manufacturing Co., Ltd., Nagaokakyo, Japan

[21] Appl. No.: 09/369,171

[22] Filed: Aug. 5, 1999

[30] Foreign Application Priority Data

Aug. 27, 1998 [JP] Japan .................................. 10-259290

[51] Int. Cl.⁷ ...................................................... B29D 11/00
[52] U.S. Cl. ............................ 264/1.7; 264/1.1; 264/254; 264/328.8; 343/753
[58] Field of Search .............................. 264/1.7, 1.1, 254, 264/255, 328.8; 425/808; 343/753, 754; 428/325, 412

[56] References Cited

U.S. PATENT DOCUMENTS 5,154,973  10/1992  Imagawa et al. .

6,036,893  3/2000  Lier et al. ................................. 264/1.7

*Primary Examiner*—Mathieu D. Vargot
*Attorney, Agent, or Firm*—Burns, Doane, Swecker & Mathis, LLP

[57] ABSTRACT

The present invention is for providing a production method of a dielectric lens with the excellent productivity, capable of achieving the shape accuracy or density homogeneity of the demanded level, and capable of injection molding of a matching layer without forming a gap with respect to a lens main body. A lens main body is formed by the injection compression molding method, using a composite dielectric material containing a thermoplastic resin as the dielectric material for the lens main body. After forming a matching layer (first surface side matching layer) on either surface of the front or rear surfaces (first surface) side of the lens main body, and injecting a matching layer material, a matching layer (second surface side matching layer) is formed on the other surface of the lens main body (that is, the matching layer is formed by the two operation injection molding method of injecting to one surface side of the lens main body, and then injection to the other surface side).

8 Claims, 9 Drawing Sheets

FIG. 1
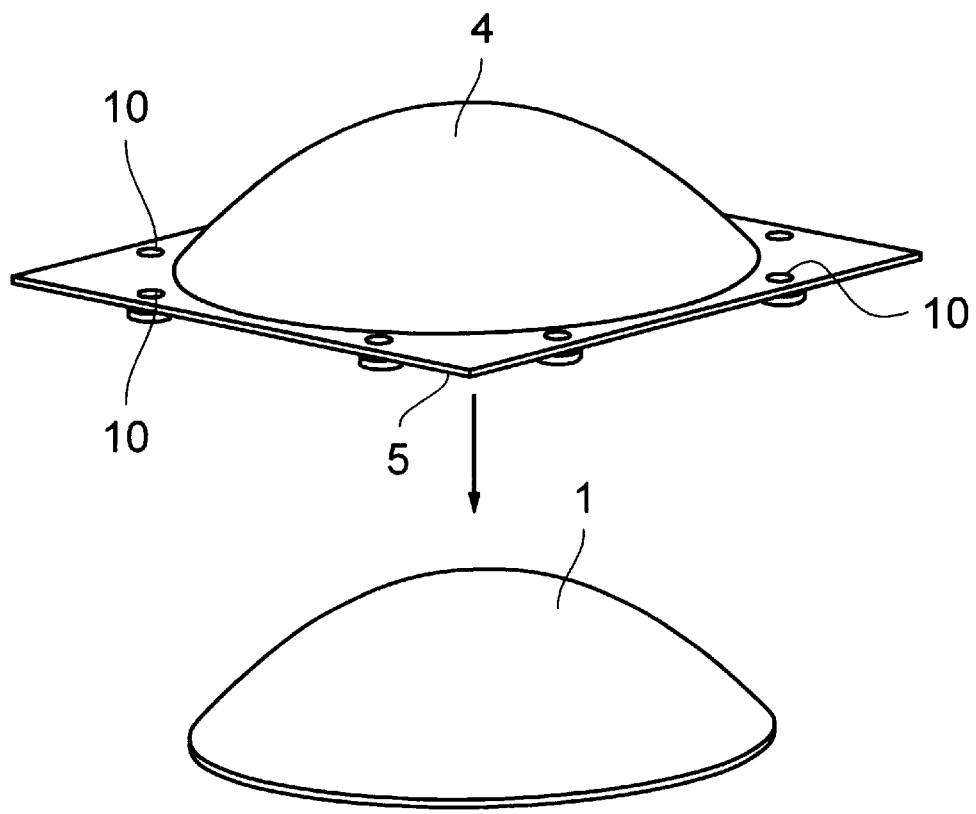
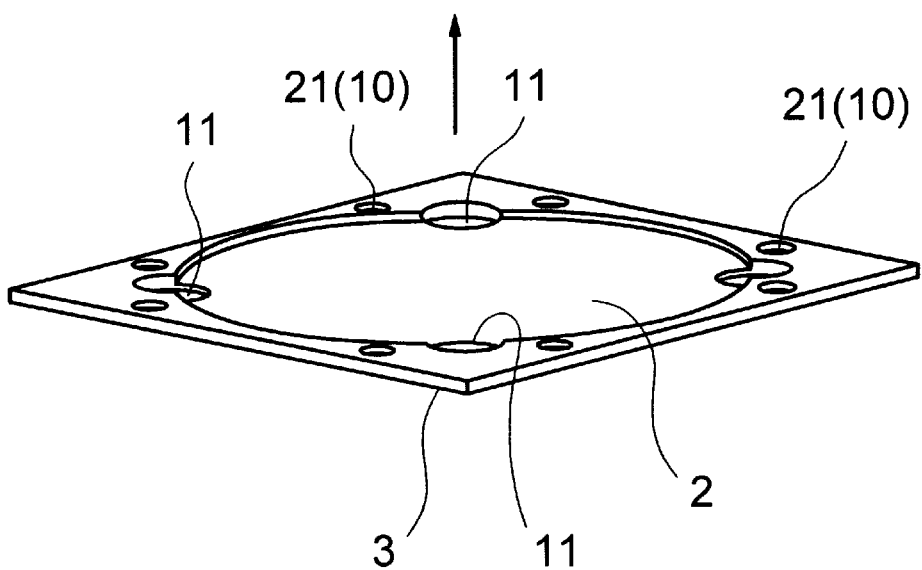

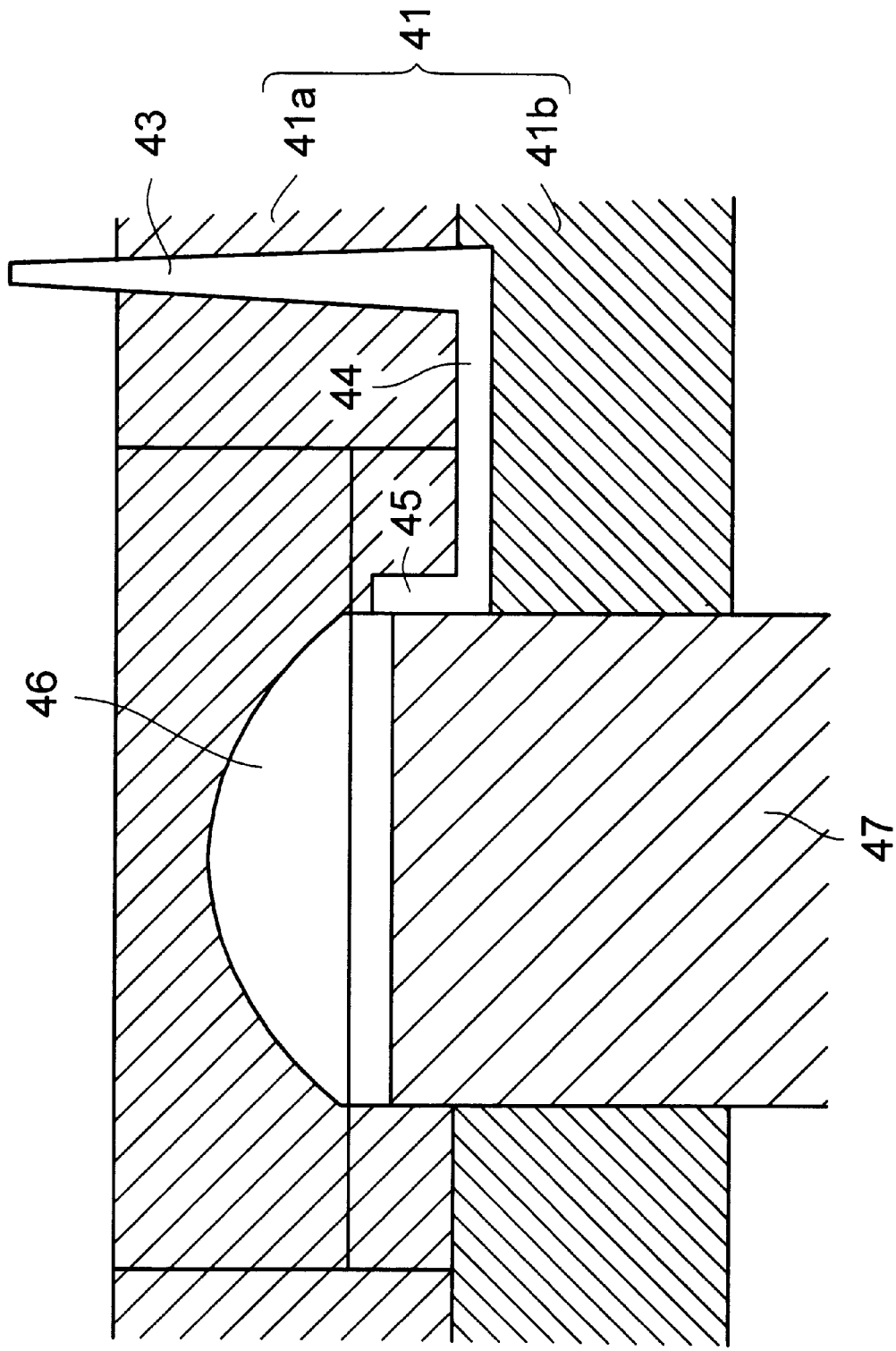

PRODUCTION METHOD OF DIELECTRIC LENS

BACKGROUND OF THE INVENTION

1. Field of the Invention

The present invention relates to a production method of a dielectric lens, more specifically, it relates to a production method of a dielectric lens having a configuration wherein a matching layer is formed on the surface of a lens main body comprising a dielectric substance.

2. Description of the Related Art

Examples of dielectric lenses include a dielectric lens having a configuration wherein a matching layer 52 is formed on the surface of a lens main body 51 comprising a dielectric substance, with a lens mounting portion 53 formed integrally with the matching layer provided in the peripheral part as shown in FIGS. 10A and 10B.

In the production of such a dielectric lens, in general, the lens main body 51 and the matching layer 52 are formed by the injection molding method.

However, since the demand level for a dielectric lens is high in terms of the shape accuracy and the density homogeneity if the frequency band to be used is a millimeter wave band, it is difficult provide it with an ordinary injection molding method.

Therefore, for the production of a dielectric lens to be used in a millimeter wave band frequency, the following have been proposed:

(1) a method of conducting the homogeneous foaming molding by injecting a molding material with a foaming agent added thereto, and (2) a method of forming a lens main body by the cutting process of a block produced by attaching plates produced by the injection molding method, or a block produced by the extrusion molding method, producing a matching layer formed independently from the lens main body by the injection molding or the cutting process, and attaching the matching layer with the lens main body.

However, according to the above-mentioned (1) method of the homogeneous foaming molding, although the molding accuracy can be satisfied, a problem arises in that bubbles formed by foaming cast adverse effect in characteristics in the millimeter wave band.

Moreover, according to the above-mentioned method (2) method of the cutting process, since the cutting process requires time as well as the step of attaching the matching layer formed independently with the land main body requires labor, a problem is involved in the productivity decline and the production cost increase. Further, in some cases, at the time of attaching the lens main body and the matching layer, a dielectric substance needs to be charged in the gap therebetween, and thus a further labor may be necessary.

SUMMARY OF THE INVENTION

In order to solve the above-mentioned problems, an object of the present invention is to provide a production method of a dielectric lens having the excellent productivity, capable of ensuring the shape accuracy and the density homogeneity of the required level, and capable of injection-molding a matching layer without forming a gap with respect to a lens main body.

In order to achieve the above-mentioned object, a production method of a dielectric lens comprising a lens main body made of a dielectric material and a matching layer provided so as to cover the surface of the lens main body according to the present invention, comprising:

(a) a lens main body forming step of forming a lens main body by the injection compression molding method of injecting and compressing a composite dielectric material containing a thermoplastic resin as the dielectric material into a mold, (b) a first matching layer forming step of forming a matching layer (first surface side matching layer) on a first surface of the lens main body by setting the lens main body formed in the lens main body forming step on a matching layer forming mold on either of the front surface side or the rear surface side (first surface side), and injecting a matching layer material into the cavity formed between the first surface and the matching layer forming mold, and (c) a second matching layer forming step of forming a matching layer (second surface side matching layer) covering the lens main body integrally with the first surface side matching layer on the second surface of the lens main body by setting the lens main body with the matching layer formed on the first surface on a matching layer forming mold on either of the front surface side or the rear surface side (second surface side) without having a matching layer formed thereon, and injecting a matching layer material into the cavity formed between the second surface and the matching layer forming mold.

By forming the lens main body by the injection compression molding method using a composite dielectric material containing a thermoplastic resin, a lens main body having high shape accuracy and density homogeneity can be formed without the need of a cutting process, which requires labor. Moreover, since the matching layer (second surface side matching layer) is formed on the other surface of the lens main body by injecting the matching layer material in the second matching layer forming step after forming the matching layer (first surface side matching layer) on either of the front and rear surfaces (one surface) of the lens main body by injecting the matching layer material in the first matching layer forming step, that is, since the two operation injection molding method of injecting to the other surface side after injecting to one surface side is used, the matching layer can be injected and molded without forming a gap with respect to the lens main body by conducting the injection molding twice on the one surface side and the other surface side, and thus, as a whole, a high quality dielectric lens having high shape accuracy and density homogeneity, without having a gap between the lens main body and the matching layer can be produced efficiently.

Moreover, in a production method of a dielectric lens according to a second aspect, the entirety of the rear surface of the lens main body is compressed in the lens main body forming step.

By compressing the entirety of the rear surface of the lens main body in the lens main body forming step, a lens main body having a high shape accuracy can be formed further efficiently, preventing the level difference formation on the lens rear surface as in the case of compressing a part of the lens rear surface.

Furthermore, in a production method of a dielectric lens according to a third aspect, the matching layer (rear surface (first surface) side matching layer) is formed on the rear surface (first surface) of the lens main body by injecting the matching layer material into the cavity formed between the rear surface (first surface) of the lens main body and the lower mold for forming the cavity, with the lens main body held between a lower mold for forming the cavity comprising a supporting pin for supporting the lens main body while lifting so as to form a predetermined gap (cavity) with respect to the rear surface of the lens main body (first surface), and a closely contacting upper mold having a concave portion with a shape closely contacting with the front surface (second surface) of the lens main body formed in the first matching layer forming step, and the matching layer (front surface (second surface) side matching layer) is formed on the front surface (second surface) of the lens main body by injecting the matching layer material into the cavity formed between the front surface (second surface) of the lens main body and the upper mold for forming the cavity, with the lens main body having the rear surface side matching layer formed held between a closely contacting lower mold for fitting and closely contacting with the rear surface side of the lens main body with the rear surface (first surface) side matching layer formed, and an upper mold corresponding with the shape of the front surface (second surface) side of the lens main body having a concave portion with a shape capable of forming a predetermined gap (cavity) with respect to the front surface (second surface) of the lens main body in the second matching layer forming step.

Since the lens main body is supported by the entirety of the front surface (second surface) side of the lens main body, using the above-mentioned lower mold for forming the cavity and closely contacting upper mold and the predetermined cavity is ensured by the supporting pin at the time of forming the rear surface (first surface) side matching layer by injecting the matching layer material, and the lens main body is supported by the entirety of the rear surface (first surface) side of the lens main body so as to ensure the predetermined cavity at the front surface (second surface) side of the lens main body for injection molding of the rear surface side matching layer and the front surface side matching layer independently, using the above-mentioned closely contacting lower mold and upper mold for forming the cavity at the time of forming the front surface side matching layer by injecting the matching layer material, a matching layer having a homogeneous thickness can be formed efficiently and certainly without generating displacement of the lens main body.

Moreover, since displacement is not generated in the lens main body by the pressure of the matching layer material at the time of the injection, a side gate, which is convenient for the gate process, can be adopted as the gate for introducing the matching layer material.

Furthermore, in a production method of a dielectric lens according to a fourth aspect, the front surface (second surface) side matching layer is bonded mechanically with the rear surface (first surface) side matching layer by forming an undercut portion at the time of forming the rear surface side matching layer, and introducing the matching layer material into the undercut portion at the time of forming the front surface (second surface) side matching layer.

Since an undercut portion is formed at the time of forming the rear surface side matching layer of the lens main body, and introducing the matching layer material into the undercut portion at the time of forming the front surface side matching layer, the bonding force between the matching layers can be improved because the front surface side matching layer is introduced into the undercut portion for mechanical bonding in addition to fusion of the materials comprising the rear surface side matching layer and the front surface side matching layer.

Moreover, in a production method of a dielectric lens according to a fifth aspect, (a) the lower mold for forming the cavity and the closely contacting upper mold are formed with a shape capable of forming a rear surface (first surface) side lens mounting portion having a plurality of through holes at a predetermined position, projecting outward from the outer periphery part of the lens main body, with the material the same as that of the matching layer, in the step of forming the rear surface (first surface) side matching layer by injecting the matching layer material into the cavity provided between the lens main body and the lower mold for forming the cavity, (b) the closely contacting lower mold and the upper mold for forming the cavity are formed with a shape capable of forming a front surface (second surface) side lens mounting portion comprising a dielectric lens mounting portion having a plurality of mounting holes at a predetermined position, projecting outward from the outer periphery part of the lens main body, with the material the same as that of the matching layer, by being integrated with the front surface side of the rear surface (first surface) side lens mounting portion by fusion, in the step of forming the front surface (second surface) side matching layer by injecting the matching layer material into the cavity provided between the lens main body and the upper mold for forming the cavity, and (c) the dielectric lens mounting portion having a plurality of mounting holes at a predetermined position, projecting outward from the outer periphery part of the lens main body, with the material the same as that of the matching layer, is formed simultaneously with the matching layer, in the step of forming the matching layer by injecting the matching layer material.

Since the lower mold for forming the cavity and the closely contacting upper mold are formed with a shape capable of forming a rear surface side lens mounting portion having a plurality of through holes at a predetermined position at the time of injection molding of the matching layer material, and the closely contacting lower mold and the upper mold for forming the cavity are formed with a shape capable of forming a front surface side lens mounting portion comprising a dielectric lens mounting portion having a plurality of mounting holes at a predetermined position, by integrating the matching layer material with the front surface side of the rear surface side lens mounting portion by fusion at the time of injection molding of the matching layer material, the dielectric lens mounting portion having a plurality of mounting holes at a predetermined position, projecting outward from the outer periphery part of the lens main body, with the material the same as that of the matching layer, can be formed simultaneously with the matching layer, at the time of forming the matching layer by injecting the matching layer material.

Furthermore, in a production method of a dielectric lens according to a sixth aspect, the hole diameter of the through holes of the rear surface side lens mounting portion formed in the above-mentioned step (a) is formed larger than the hole diameter of the mounting holes of the dielectric lens mounting portion to be formed ultimately, and the mounting holes of the dielectric lens mounting portion are provided with a predetermined hole diameter at the time of forming the front surface side lens mounting portion by injecting the matching layer material in the above-mentioned step (b).

If the hole diameter of the through holes of the rear surface side lens mounting portion formed is formed larger than the hole diameter of the mounting holes of the dielectric lens mounting portion to be formed ultimately, and the front surface side lens mounting portion is integrated with the rear surface side lens mounting portion as well as the mounting holes of the dielectric lens mounting portion are provided with a predetermined hole diameter at the time of forming the front surface side lens mounting portion, in inserting the lens main body with the rear surface side matching layer formed into a mold for forming the front surface side matching layer, it is inserted easily regardless of irregularity in the through hole pitch or the shape of the rear surface side lens mounting hole as well as the pitch accuracy and the shape of the mounting holes can be adjusted only with the mold for forming the front surface side matching layer.

BRIEF DESCRIPTION OF THE DRAWINGS

FIG. 1 is an exploded perspective view showing a dielectric lens produced by one embodiment of a production method of a dielectric lens according to the present invention.

FIG. 3 is a cross-sectional view showing a mold used for forming the lens main body in the embodiment of the production method of a dielectric lens according to the present invention.

DESCRIPTION OF THE PREFERRED EMBODIMENT

Hereinafter features of the present invention will be explained in further detail with reference to an embodiment thereof.

Figure 2:
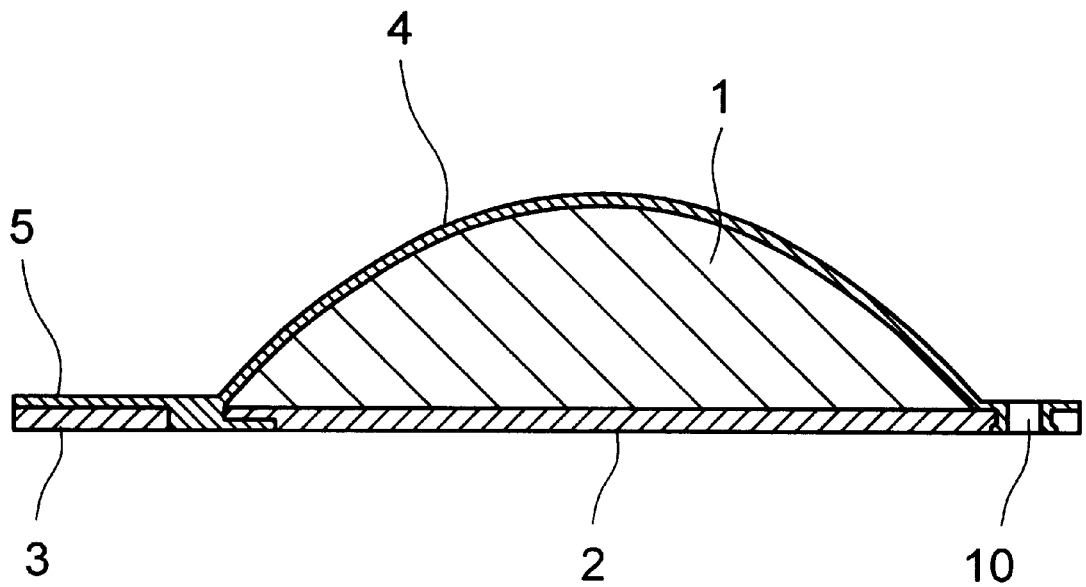
FIG. 2 is a cross-sectional view showing a dielectric lens produced by the embodiment of the production method of a dielectric lens according to the present invention.

FIG. 1 is an exploded perspective view showing a dielectric lens produced by one embodiment of a production method of a dielectric lens according to the present invention, and FIG. 2 is a cross-sectional view of the dielectric lens.

The dielectric lens is for a millimeter wave band comprising a composite dielectric material containing a thermoplastic resin. It comprises a lens main body 1 having a shape partially spherical in the front surface side (upper surface side) and substantially flat in the rear surface side (lower surface side), a rear surface side matching layer 2 formed on the rear surface side of the lens main body 1, a rear surface side lens mounting portion 3 formed integrally with the rear surface side matching layer 2, projecting outward from the outer periphery of the lens main body 1, a front surface side matching layer 4 formed on the front surface side of the lens main body 1, and a front surface side lens mounting portion 5 formed integrally with the front surface side matching layer 4, projecting outward form the outer periphery of the lens main body 1.

Further, although the rear surface side matching layer 2 and the front surface side matching layer 4 are completely fused to be integrated and the front rear surface side lens mounting portion 3 formed integrally with the rear surface side matching layer 2 and the front surface side lens mounting portion 5 formed integrally with the front surface side matching layer 4 are completely fused to be integrated, in order to facilitate understanding, in FIG. 1, the rear surface side matching layer 2 and the front surface side matching layer 4, and the rear surface side lens mounting portion 3 and the front surface side lens mounting portion 5 are shown separately.

Moreover, in the above-mentioned rear surface side lens mounting portion 3, the through holes 21 to be the mounting holes 10 are formed for mounting the dielectric lens to a predetermined subject to be mounted, and the holes 11 are formed for forming the undercut portion for providing the matching layer material to the rear surface side of the lens main body 1 at the time of forming the front surface side matching layer 4.

Furthermore, in the front surface side lens mounting portion 5, the mounting holes 10 are formed for mounting the dielectric lens.

A production method of a dielectric lens will be explained with reference to FIGS. 3 to 9.
[Lens main body formation]

In forming a lens main body, a mold 41 as shown in FIG. 3 was used. The mold 41 comprises an upper mold 41a and a lower mold 41b. According to the upper mold 41a and the lower mold 41b, a sprue hole 43 to be the path of a molding material, a runner groove 44, a side gate 45 and a cavity are formed inside thereof, as well as compression molding of the molding material injected into the cavity 46 can be conducted by compressing the entirety of the rear surface of the lens main body by raising a compressing core 47.

Figure 4:
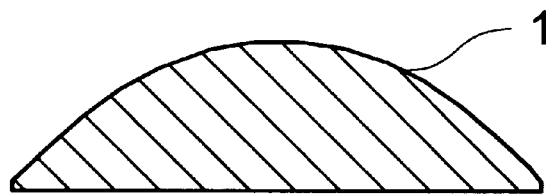
FIG. 4 is a cross-sectional view showing a lens main body formed in the embodiment of the production method of a dielectric lens according to the present invention.

With a composite dielectric material containing a ceramic (CaTiO3) and a polypropylene (MS650 produced by Tokuyama Soda Corp.) used as the molding material for the lens main body, the lens main body 1 having a shape partially spherical in the front surface side (upper surface side) and substantially flat in the rear surface side (lower surface side) as shown in FIG. 4 was obtained by the injection compression molding with the following condition, using the mold 41.

Since the lens main body was compressed with the compressing core pressed onto the rear surface of the lens main body, a lens main body with a high size accuracy was obtained without forming a level difference part in the lower surface of the lens main body.

(1) Injection condition
   Mold temperature: 110° C.
   Cylinder temperature: 190° C.
   Injection rate: 10 mm/sec
   Cooling time: 600 sec
(2) Compression condition
   Compression stroke: 4 mm
   Compressing force: 1,859 kg/cm$^2$
   Compression timing: 30 sec (after touching the mold)
   Compression rate: 458 mm/sec The molding condition of the lens main body is not limited to the above-mentioned example, but it is preferable to set an appropriate molding condition in consideration of the shape of the lens main body, the material to be used, or the like.

[Matching layer formation]

Figure 5:
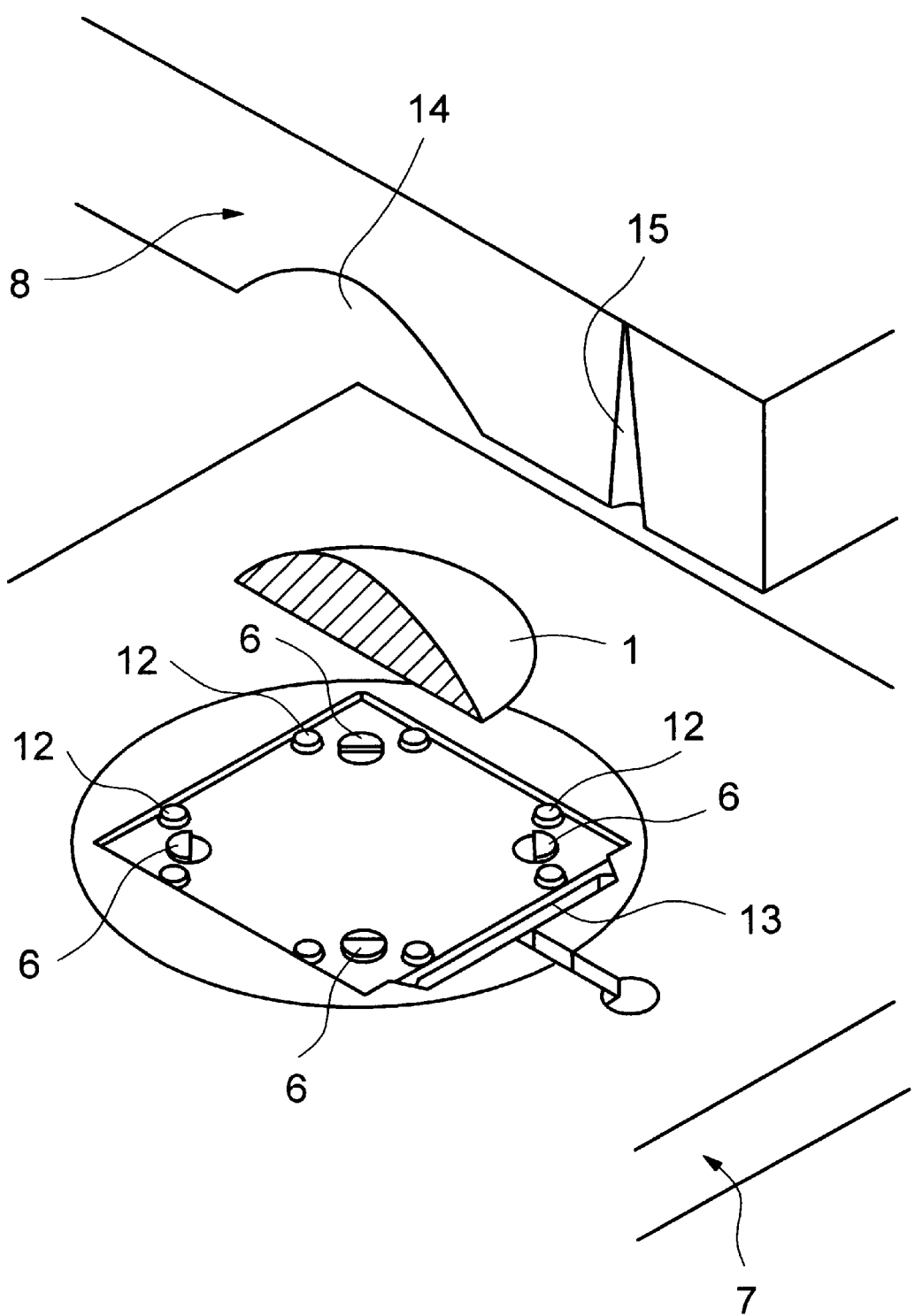
FIG. 5 is a diagram showing the step of forming the rear surface side matching layer and the rear surface side lens mounting portion in the embodiment of the production method of a dielectric lens according to the present invention.
Figure 6:
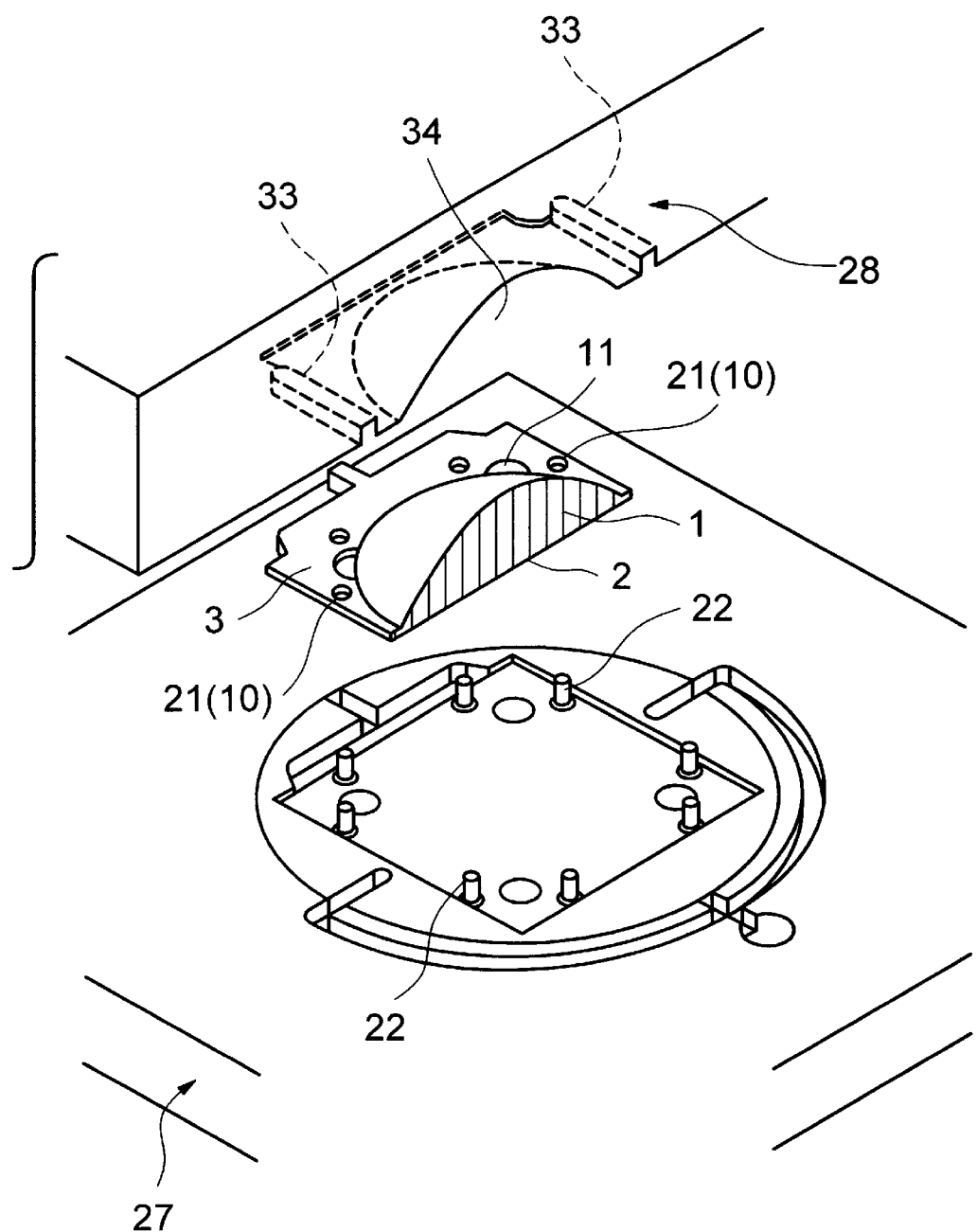
FIG. 6 is a diagram showing the step of forming the front surface side matching layer and the front surface side lens mounting portion in the embodiment of the production method of a dielectric lens according to the present invention.
Figure 7:
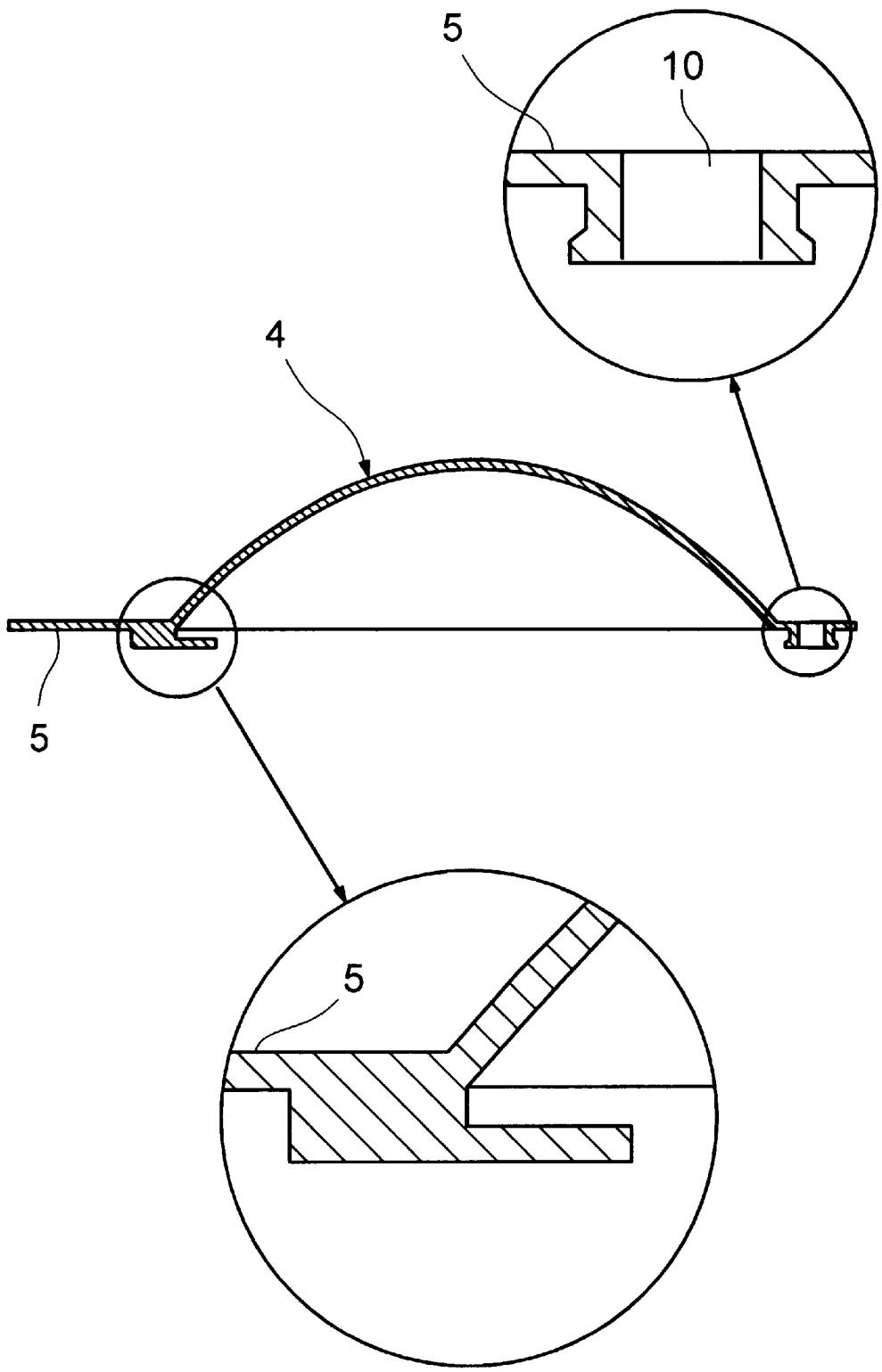
FIG. 7 is a cross-sectional view showing the configuration of the front surface side matching layer and the front surface side lens mounting portion formed in the embodiment of the production method of a dielectric lens according to the present invention.

FIGS. 5 and 6 are diagrams showing steps of forming a matching layer on the surface of the lens main body. FIG. 5 shows the step of forming the rear surface side matching layer 2 (FIG. 2) and the rear surface side lens mounting portion 3 (FIG. 2), and FIG. 6 shows the step of forming the front surface side matching layer 4 (FIG. 2) and the front surface side lens mounting portion 5 (FIG. 2). In FIGS. 5 and 6, the lens main body 1 and the upper mold 8, 28 are divided in two vertically, and only one of them is shown for facilitate understanding.

(a) Rear surface side matching layer formation

As shown in FIG. 5, by supporting the lens main body 1 while lifted, a predetermined gap (cavity) is formed with respect to the rear surface of the lens main body 1. Then, the lens main body 1 is held between the lower mold (mold) 7 for forming the cavity comprising 4 supporting pins 6 for forming the holes 11 for forming the undercut portion (FIG. 1), 8 pins (core pins) 21 for forming the through holes for forming the mounting holes for mounting the dielectric lens (FIG. 1), and a gate (side gate) 13 for supplying the matching layer material (molten resin), and the closely contacting upper mold (mold) 8 with the concave portion 14 having a shape corresponding with the spherical shape of the front surface side of the lens main body 1 so as to closely contacting with the front surface of the lens main body 1, and the sprue hole 15 for supplying the matching layer material (in this embodiment, a molten polypropylene resin) formed. Accordingly, the cavity is formed between the rear surface of the lens main body 1 and the lower mold for forming the cavity 7.

Then, by injecting the matching layer material into the cavity formed between the lens main body 1 and the lower mold for forming the cavity 7 by the following condition, the rear surface side matching layer 2 (FIGS. 1 and 2) and the rear surface side lens mounting portion 3 (FIGS. 1 and 2) are formed.

(Molding condition)
   Mold temperature: 60° C.
   Cylinder temperature: 260° C.
   Injection pressure: 500 kg/cm$^2$
   Injection rate: 15 mm/sec
   Cooling time: 15 sec (b) Front surface side matching layer formation Then, as shown in FIG. 6, the lens main body 1 with the rear surface side matching layer 2 and the rear surface side lens mounting portion 3 formed is held between the closely contacting lower mold (mold) 27 having a shape corresponding with the shape of the rear surface side matching layer 2 including the rear surface side lens mounting portion 3, comprising the core pins 22 for forming the mounting holes 10 for mounting the dielectric lens, and the upper mold for forming the cavity (mold) 28 with the partially spherical concave portion 34 formed so as to form a predetermined gap (cavity) to be the front surface side matching layer 4 and the front surface side lens mounting portion 5 (FIGS. 1 and 2) with respect to the lens main body 1. By injecting the matching layer material into the cavity formed between the lens main body 1 and the upper mold for forming the cavity 28 with the following condition, the matching layer (front surface side matching layer) 4 and the front surface side lens mounting portion 5 are formed on the front surface of the lens main body 1. The matching layer material is injected into the cavity from the two side gates 33.

(Molding condition)
   Mold temperature: 60° C.
   Cylinder temperature: 260° C.
   Injection pressure: 500 kg/cm$^2$
   Injection rate: 20 mm/sec
   Cooling time: 15 sec The configuration of the front surface side matching layer 4 and the front surface side lens mounting portion 5 accordingly formed is shown in FIG. 6. The front surface side matching layer 4 and the front surface side lens mounting portion 5 are actually fused and integrated with the rear surface side matching layer 2 (FIGS. 1 and 2) and the rear surface side lens mounting portion 3 (FIGS. 1 and 2).

As mentioned above, according to the production method of a dielectric lens of this embodiment, since the front surface side of the lens main body 1 is closely contacted with the concave portion 14 of the closely contacting upper mold 8 so that the lens main body 1 is supported by the entirety of the front surface side of the lens main body 1 as well as the predetermined cavity is ensured by the 4 supporting pins 6 at the time of forming the rear surface side matching layer 2 by injecting the matching layer material, the rear surface side matching layer 2 can be formed without the risk of the lens main body displacement or the gap generation with respect to the lens main body. Moreover, since the lens main body 1 displacement is not generated by the pressure of the matching layer material at the time of the injection, a side gate, which is convenient for the gate process, can be adopted as the gate for introducing the matching layer material so that the injection molding can be conducted efficiently.

Furthermore, since the lens main body 1 is supported by the entirety of the rear surface side of the lens main body 1 as well as the matching layer material is introduced from the two side gates 33 at the time of forming the front surface side matching layer 4 by injecting the matching layer material, a front surface side matching layer 4 with a homogeneous thickness can be formed certainly without generating displacement of the lens main body 1 with the rear surface side matching layer 2 and the rear surface side lens mounting portion 3 formed.

Therefore, according to the method of the above-mentioned embodiment, a dielectric lens with a matching layer with a homogeneous thickness formed on the surface of a lens main body and provided with a lens mounting portion can be produced efficiently.

Figure 8A:
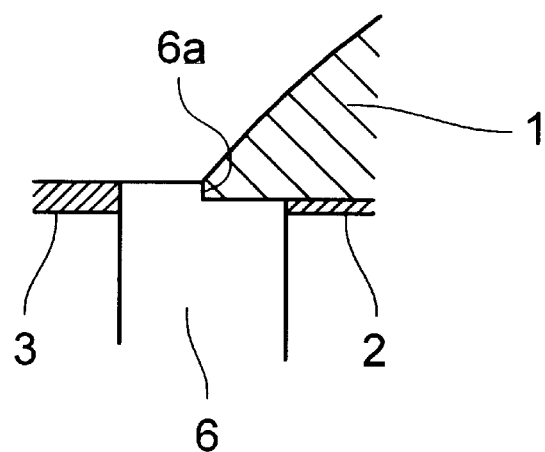
FIGS. 8A, 8B and 8C are cross-sectional views showing the step of forming the undercut portion by a supporting pin in the embodiment of the production method of a dielectric lens according to the present invention.
Figure 8B:
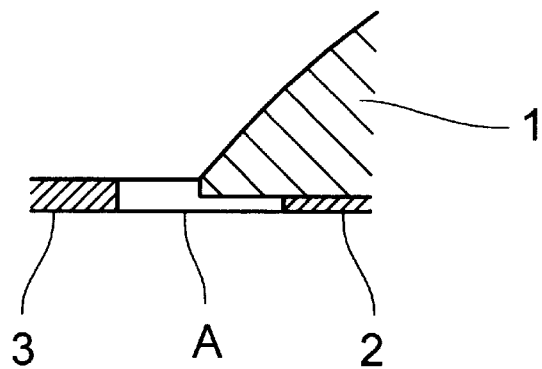
Figure 8C:
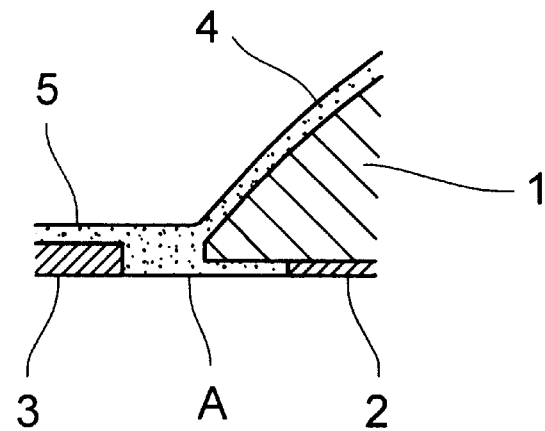

Moreover, since the 4 supporting pins 6 having a configuration with a level difference part 6a formed on the surface are used as shown in FIGS. 5 and 8A in the above-mentioned embodiment, tile undercut portion (gap) A is formed as shown in FIG. 8B after the injection molding of the matching layer material at the time of forming the rear surface side matching layer 2. Furthermore, since the matching layer material is introduced into the undercut portion A as shown in 8C at the time of the injection molding of the front surface side matching layer 4 so that mechanical bonding is provided by the introduction of the front surface side matching layer 4 into the undercut portion A in addition to the fusion of the materials comprising the rear surface side matching layer 2 and the front surface side matching layer 4, the lens main body 1 and the front surface side matching layer 4 are bonded further securely.

Figure 9A:
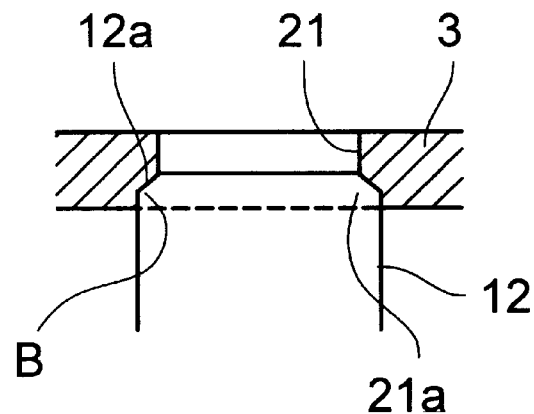
FIGS. 9A, 9B and 9C are cross-sectional views showing the step of forming the mounting holes of the lens mounting portion in the embodiment of the production method of a dielectric lens according to the present invention.
Figure 9B:
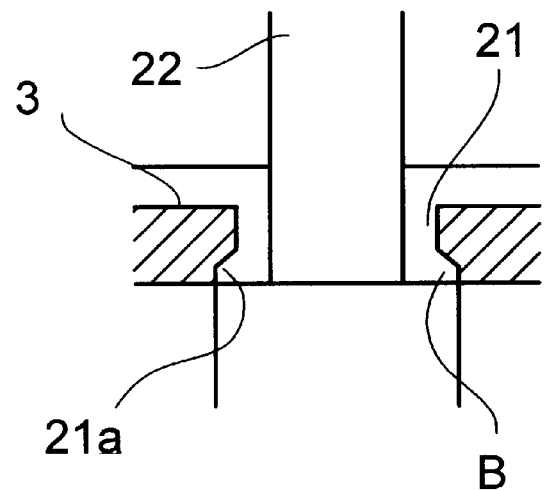

Moreover, since the 8 pins (core pins) 12 for forming the through holes 21 for forming the mounting holes in the rear surface side lens mounting portion 3 provided with a tapered level difference portion 12a having a large diameter portion below the level difference portion 12a and a small diameter portion above the level difference portion 12a are used as shown in FIG. 9A in the above-mentioned embodiment, the through holes 21 having a diameter larger than the mounting holes 10 (FIG. 9C) to be formed ultimately, provided with a tapered level difference portion 21a for forming the undercut portion B in the inner surface can be formed as shown in FIGS. 9A and 9B after the injection molding of the rear surface side matching layer 2 and the rear surface side lens mounting portion 3.

Figure 9C:
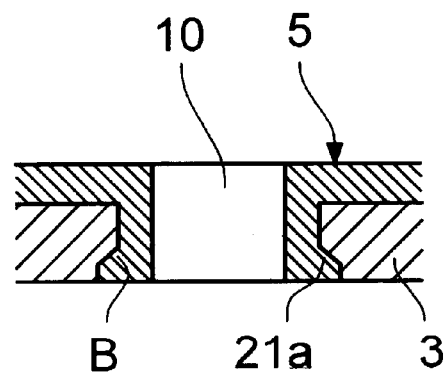
Figure 10A:
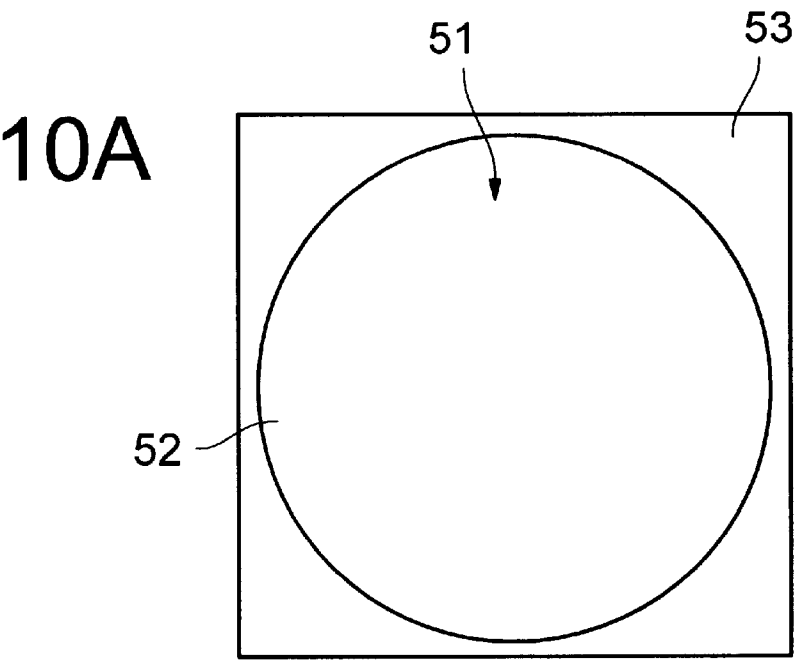
FIG. 10A is a plan view and FIG. 10B is a cross-sectional view of a conventional dielectric lens.
Figure 10B:
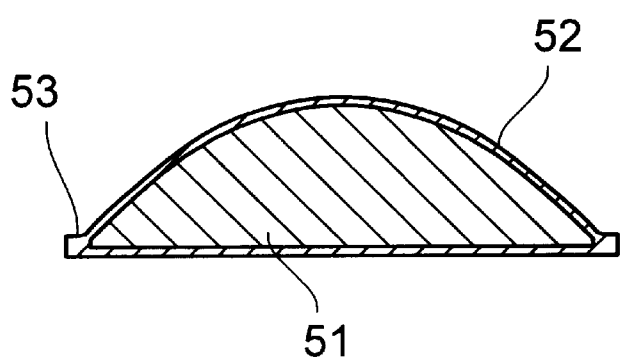

By injecting the matching layer material for forming the front surface side matching layer 4 and the front surface side lens mounting portion 5 with the core pins 22 of the closely contacting lower mold 27 (FIG. 6) fitted in the through holes 21 as shown in FIG. 9B, the front surface side lens mounting portion 5 comprising the mounting holes 10 having a predetermined diameter can be formed as shown in FIG. 9C. Since the front surface side matching layer 4 (front surface side lens mounting portion 5) and the rear surface side matching layer 2 (rear surface side lens mounting portion 3) are fused in the vicinity of the mounting holes 10 as shown in FIG. 9C as well as the matching layer material for forming the front surface side matching layer is introduced into the undercut portion B below the tapered level difference portion 21a for the mechanical bonding, they can be bonded further securely.

Furthermore, since the through holes 21 larger than the mounting holes 10 to be formed ultimately are formed in the step of forming the rear surface side lens mounting portion 3 and the mounting holes 10 having a predetermined hole diameter are formed at the time of forming the front surface side lens mounting portion 5, the positioning accuracy in inserting the integrally molded product comprising the lens main body 1 with the rear surface side matching layer 2 and the rear surface side lens mounting portion 3 formed into the mold needs not be very high, irregularity of the pitch and the shape of the through holes 21 can be tolerated to some extent, and the pitch accuracy, the shape, or the like of the mounting holes 10 can be adjusted only with the mold to be used for forming the front surface side matching layer. Therefore, a dielectric lens can be produced efficiently so that the productivity can be improved.

Moreover, since the undercut portions A, B are provided only to the rear surface side lens mounting portion to be formed integrally with the rear surface side matching layer and the matching layer material is introduced at the time of forming the front surface side matching layer in the above-mentioned embodiment, a mark does not remain on the surface of the front surface side matching layer, and thus the appearance can be improved.

Furthermore, although the case of using a composite dielectric material containing a ceramic (CaTiO3) and a polypropylene (MS650 produced by Tokuyama Soda Corp.) as the material comprising the lens main body has been explained in the above-mentioned embodiment, the material comprising the lens main body is not limited thereto, but various kinds of dielectric materials containing a thermoplastic resin can be used as well.

Moreover, although the case of using a polypropylene as the matching layer material has been explained in the above-mentioned embodiment, the matching layer material is not limited thereto, but various kinds of other dielectric materials can be used.

Furthermore, although the case of forming the matching layer on the rear surface side (first surface side) of the lens main body first and then forming the matching layer on the front surface side (second surface side) of the lens main body has been explained in the above-mentioned embodiment, it is also possible to form the matching layer on the front surface side of the lens main body first and then form the matching layer on the rear surface side of the lens main body.

The present invention is not limited to the above-mentioned embodiment in other aspects, and various kinds of application and modification can be adopted within the range of the gist of the invention in terms of the concrete configuration of the material comprising the lens or the matching layer, the molding condition or shape of the lens main body, the configuration of the matching layer or the lens mounting portion, the shape of the mounting holes, the lower mold for forming the cavity and the closely contacting upper mold to be used at the time of forming the lower surface side matching layer, and the closely contacting lower mold and the upper mold for forming the cavity to be used at the time of forming the upper surface side matching layer.

Since the lens main body is formed by the injection compression molding method using a composite dielectric material containing a thermoplastic resin in the production method of a dielectric lens according to the present invention, a lens main body having high shape accuracy and density homogeneity can be formed without the need of a cutting process, which requires labor.

Moreover, since the matching layer (second surface side matching layer) is formed on the other surface of the lens main body by injecting the matching layer material in the second matching layer forming step after forming the matching layer (first surface side matching layer) on either of the front and rear surfaces (one surface) of the lens main body by injecting the matching layer material in the first matching layer forming step, that is, the two operation injection molding method of injecting to the other surface side after injecting to one surface side is used, the matching layer can be injected and molded without forming a gap with respect to the lens main body, and thus, as a whole, a high quality dielectric lens having high shape accuracy and density homogeneity, without having a gap between the lens main body and the matching layer can be produced efficiently.

Moreover, since the entirety of the rear surface of the lens main body is compressed in the step of compression molding of the lens main body in the production method of a dielectric lens according to the second aspect, a lens main body having a high shape accuracy can be formed further efficiently, preventing the level difference formation on the lens rear surface.

Since the lens main body is supported by the entirety of the front surface (second surface) side of the lens main body, using the above-mentioned lower mold for forming the cavity and closely contacting upper mold and the predetermined cavity is ensured by the supporting pin at the time of forming the rear surface (first surface) side matching layer by injecting the matching layer material, and the lens main body is supported by the entirety of the rear surface (first surface) side of the lens main body so as to ensure the predetermined cavity at the front surface (second surface) side of the lens main body for injection molding of the rear surface side matching layer and the front surface side matching layer independently, using the above-mentioned closely contacting lower mold and upper mold for forming the cavity at the time of forming the front surface side matching layer by injecting the matching layer material in the production method of a dielectric lens according to the third aspect, a matching layer having a homogeneous thickness can be formed efficiently and certainly without generating displacement of the lens main body further certainly.

Moreover, since displacement is not generated in the lens main body by the pressure of the matching layer material at the time of the injection, a side gate, which is convenient for the gate process, can be adopted as the gate for introducing the matching layer material.

Since an undercut portion is formed at the time of forming the rear surface side matching layer of the lens main body, and introducing the matching layer material into the undercut portion at the time of forming the front surface side matching layer in the production method of a dielectric lens according to the fourth aspect, the bonding force between the matching layers can be improved because the front surface side matching layer is introduced into the undercut portion for mechanical bonding in addition to fusion of the materials comprising the rear surface side matching layer and the front surface side matching layer.

Since the lower mold for forming the cavity and the closely contacting upper mold are formed with a shape capable of forming a rear surface side lens mounting portion having a plurality of through holes at a predetermined position at the time of injection molding of the matching layer material, and the closely contacting lower mold and the upper mold for forming the cavity are formed with a shape capable of forming a front surface side lens mounting portion comprising a dielectric lens mounting portion having a plurality of mounting holes at a predetermined position, by integrating the matching layer material with the front surface side of the rear surface side lens mounting portion by fusion at the time of injection molding of the matching layer material in the production method of a dielectric lens according to the fifth aspect, the dielectric lens mounting portion having a plurality of mounting holes at a predetermined position, projecting outward from the outer periphery part of the lens main body, with the material the same as that of the matching layer, can be formed simultaneously with the matching layer, at the time of forming the matching layer by injecting the matching layer material, and thus the present invention can be further effective.

Since the hole diameter of the through holes of the rear surface side lens mounting portion formed is formed larger than the hole diameter of the mounting holes of the dielectric lens mounting portion to be formed ultimately, and the front surface side lens mounting portion is integrated with the rear surface side lens mounting portion as well as the mounting holes of the dielectric lens mounting portion are provided with a predetermined hole diameter at the time of forming the front surface side lens mounting portion in the production method of a dielectric lens according to the sixth aspect, in inserting the lens main body with the rear surface side matching layer formed into a mold for forming the front surface side matching layer, it is inserted easily regardless of irregularity in the through hole pitch or the shape of the rear surface side lens mounting hole as well as the pitch accuracy and the shape of the mounting holes can be adjusted only with the mold for forming the front surface side matching layer, and thus it is advantageous in that the production process can be simplified.

What is claimed is:

1. A production method of a dielectric lens comprising a lens main body made of a dielectric material and a matching layer provided so as to cover the surface of the lens main body comprising:

(a) a lens main body forming step of forming a lens main body by an injection compression molding method of injecting and compressing a composite dielectric material containing a thermoplastic resin as the dielectric material into a mold, (b) a first matching layer forming step of forming a matching layer (first surface side matching layer) on a first surface of the lens main body by setting the lens main body formed in the lens main body forming step on a matching layer forming mold on either of the front surface side or the rear surface side (first surface side), and injecting a matching layer material into the cavity formed between the first surface and the matching layer forming mold, and (c) a second matching layer forming step of forming a matching layer (second surface side matching layer) covering the lens main body integrally with the first surface side matching layer on the second surface of the lens main body by setting the lens main body with the matching layer formed on the first surface on a matching layer forming mold on either of the front surface side or the rear surface side (first surface side) without having a matching layer formed thereon, and injecting a matching layer material into the cavity formed between the second surface and the matching layer forming mold.

2. The production method of a dielectric lens according to claim 1, wherein the entirety of the rear surface of the lens main body is compressed in the lens main body forming step.

3. The production method of a dielectric lens according to claim 1, wherein the matching layer (rear surface (first surface) side matching layer) is formed on the rear surface (first surface) of the lens main body by injecting the matching layer material into the cavity formed between the rear surface (first surface) of the lens main body and a lower mold for forming the cavity, with the lens main body held between the lower mold for forming the cavity comprising a supporting pin for supporting the lens main body while lifting so as to form a predetermined gap (cavity) with respect to the rear surface of the lens main body (first surface), and a closely contacting upper mold having a concave portion with a shape closely contacting with the front surface (second surface) of the lens main body formed in the first matching layer forming step, and the matching layer (front surface (second surface) side matching layer) is formed on the front surface (second surface) of the lens main body by injecting the matching layer material into the cavity formed between the front surface (second surface) of the lens main body and an upper mold for forming the cavity, with the lens main body having the rear surface side matching layer formed held between a closely contacting lower mold for fitting and closely contacting with the rear surface side of the lens main body with the rear surface (first surface) side matching layer formed, and the upper mold corresponding with the shape of the front surface (second surface) side of the lens main body having a concave portion with a shape capable of forming a predetermined gap (cavity) with respect to the front surface (second surface) of the lens main body in the second matching layer forming step.

4. The production method of a dielectric lens according to claim 3, wherein the front surface (second surface) side matching layer is bonded mechanically with the rear surface (first surface) side matching layer by forming an undercut portion at the time of forming the rear surface side matching layer, and introducing the matching layer material into the undercut portion at the time of forming the front surface (second surface) side matching layer.

5. The production method of a dielectric lens according to claim 3, wherein (a) the lower mold for forming the cavity and the closely contacting upper mold are formed with a shape capable of forming a rear surface (first surface) side lens mounting portion having a plurality of through holes at a predetermined position, projecting outward from the outer periphery part of the lens main body, with the material the same as that of the matching layer, in the step of forming the rear surface (first surface) side matching layer by injecting the matching layer material into the cavity provided between the lens main body and the lower mold for forming the cavity, (b) the closely contacting lower mold and the upper mold for forming the cavity are formed with a shape capable of forming a front surface (second surface) side lens mounting portion comprising a dielectric lens mounting portion having a plurality of mounting holes at a predetermined position, projecting outward from the outer periphery part of the lens main body, with the material the same as that of the matching layer, by being integrated with the front surface side of the rear surface (first surface) side lens mounting portion by fusion, in the step of forming the front surface (second surface) side matching layer by injecting the matching layer material into the cavity provided between the lens main body and the upper mold for forming the cavity, and (c) the dielectric lens mounting portion having a plurality of mounting holes at a predetermined position, projecting outward from the outer periphery part of the lens main body, with the material the same as that of the matching layer, is formed simultaneously with the matching layer, in the step of forming the matching layer by injecting the matching layer material.

6. The production method of a dielectric lens according to claim 5, wherein the hole diameter of the through holes of the rear surface side lens mounting portion formed in the step (a) is formed larger than the hole diameter of the mounting holes of the dielectric lens mounting portion to be formed ultimately, and the mounting holes of the dielectric lens mounting portion are provided with a predetermined hole diameter at the time of forming the front surface side lens mounting portion by injecting the matching layer material in the step (b).

7. The production method of a dielectric lens according to claim 2, wherein the matching layer (rear surface (first surface) side matching layer) is formed on the rear surface (first surface) of the lens main body by injecting the matching layer material into the cavity formed between the rear surface (first surface) of the lens main body and a lower mold for forming the cavity, with the lens main body held between the lower mold for forming the cavity comprising a supporting pin for supporting the lens main body while lifting so as to form a predetermined gap (cavity) with respect to the rear surface of the lens main body (first surface), and a closely contacting upper mold having a concave portion with a shape closely contacting with the front surface (second surface) of the lens main body formed in the first matching layer forming step, and the matching layer (front surface (second surface) side matching layer) is formed on the front surface (second surface) of the lens main body by injecting the matching layer material into the cavity formed between the front surface (second surface) of the lens main body and an upper mold for forming the cavity, with the lens main body having the rear surface side matching layer formed held between a closely contacting lower mold for fitting and closely contacting with the rear surface side of the lens main body with the rear surface (first surface) side matching layer formed, and the upper mold corresponding with the shape of the front surface (second surface) side of the lens main body having a concave portion with a shape capable of forming a predetermined gap (cavity) with respect to the front surface (second surface) of the lens main body in the second matching layer forming step.

8. The production method of a dielectric lens according to claim 4, wherein (a) the lower mold for forming the cavity and the closely contacting upper mold are formed with a shape capable of forming a rear surface (first surface) side lens mounting portion having a plurality of through holes at a predetermined position, projecting outward from the outer periphery part of the lens main body, with the material the same as that of the matching layer, in the step of forming the rear surface (first surface) side matching layer by injecting the matching layer material into the cavity provided between the lens main body and the lower mold for forming the cavity, (b) the closely contacting lower mold and the upper mold for forming the cavity are formed with a shape capable of forming a front surface (second surface) side lens mounting portion comprising a dielectric lens mounting portion having a plurality of mounting holes at a predetermined position, projecting outward from the outer periphery part of the lens main body, with the material the same as that of the matching layer, by being integrated with the front surface side of the rear surface (first surface) side lens mounting portion by fusion, in the step of forming the front surface (second surface) side matching layer by injecting the matching layer material into the cavity provided between the lens main body and the upper mold for forming the cavity, and (c) the dielectric lens mounting portion having a plurality of mounting holes at a predetermined position, projecting outward from the outer periphery part of the lens main body, with the material the same as that of the matching layer, is formed simultaneously with the matching layer, in the step of forming the matching layer by injecting the matching layer material.

* * * * *